US010232511B2

(12) United States Patent
Hofmann et al.

(10) Patent No.: US 10,232,511 B2
(45) Date of Patent: Mar. 19, 2019

(54) METHOD FOR CALIBRATING A MEASURING APPARATUS FOR MEASURING BODY PARTS AND OTHER WORKPIECES, AND MEASURING APPARATUS SUITABLE FOR CARRYING OUT THE METHOD

(71) Applicant: CARL ZEISS AUTOMATED INSPECTION GMBH & CO. KG, Oehringen (DE)

(72) Inventors: Peter Hofmann, Niedernhall (DE); Heiko Goller, Obersulm (DE); Michael Kocab, Oehringen (DE)

(73) Assignee: CARL ZEISS AUTOMATED INSPECTION GMBH, Öhringen (DE)

( * ) Notice: Subject to any disclaimer, the term of this patent is extended or adjusted under 35 U.S.C. 154(b) by 133 days.

(21) Appl. No.: 15/590,634

(22) Filed: May 9, 2017

(65) Prior Publication Data

US 2017/0326732 A1    Nov. 16, 2017

(30) Foreign Application Priority Data

May 12, 2016    (DE) .................. 10 2016 005 699

(51) Int. Cl.
*B25J 9/16*    (2006.01)
*B25J 19/02*    (2006.01)
(Continued)

(52) U.S. Cl.
CPC .............. *B25J 9/1692* (2013.01); *B25J 9/16* (2013.01); *B25J 19/023* (2013.01);
(Continued)

(58) Field of Classification Search
CPC ..... B25J 9/1692; B25J 19/023; G01B 21/042; G05B 19/4015; G05B 2219/37068; G05B 2219/39024
See application file for complete search history.

(56) References Cited

U.S. PATENT DOCUMENTS 6,615,112 B1    9/2003    Roos
9,193,073 B1 *  11/2015   Huang ............... B25J 9/1692
(Continued)

FOREIGN PATENT DOCUMENTS

EP          1189732 B1     5/2003

*Primary Examiner* — Dale Moyer
(74) *Attorney, Agent, or Firm* — Harness, Dickey & Pierce, P.L.C.

(57) ABSTRACT

A measuring apparatus comprises an industrial robot and a sensor fastened to a movable arm of the robot. A calibration body comprises a calibration element, a carrier, and an alignment element rigidly arranged relative to the carrier. The alignment element interacts with a counter piece provided on a carrying structure. Data specifying the pose of the calibration element relative to the alignment element are encoded in an encoding zone which may be embodied as a data matrix code. The calibration body is initially aligned on the carrying structure with the aid of the alignment element and the counter piece. The sensor then approaches the encoding zone to read the data encoded therein. Subsequently, the pose of the calibration element relative to the carrying structure is determined using the previously read data. Finally, the pose of the calibration element is measured by the sensor to calibrate the measuring apparatus.

11 Claims, 2 Drawing Sheets

(51) Int. Cl.
    *G01B 21/04*    (2006.01)
    *G05B 19/401*   (2006.01)
(52) U.S. Cl.
    CPC ....... *G01B 21/042* (2013.01); *G05B 19/4015* (2013.01); *G05B 2219/37068* (2013.01); *G05B 2219/39024* (2013.01)

(56) References Cited

U.S. PATENT DOCUMENTS

| | | | |
|---|---|---|---|
| 2012/0078418 A1* | 3/2012 | Borm | B25J 9/1692 700/254 |
| 2014/0100694 A1* | 4/2014 | Rueckl | B25J 9/1692 700/254 |
| 2016/0086343 A1* | 3/2016 | Namiki | G06T 7/593 348/135 |
| 2016/0114486 A1* | 4/2016 | Huang | B25J 9/1692 700/254 |
| 2017/0072566 A1* | 3/2017 | Murata | B25J 9/1692 |
| 2017/0095930 A1* | 4/2017 | Warashina | B25J 9/1664 |

* cited by examiner

METHOD FOR CALIBRATING A MEASURING APPARATUS FOR MEASURING BODY PARTS AND OTHER WORKPIECES, AND MEASURING APPARATUS SUITABLE FOR CARRYING OUT THE METHOD

CROSS-REFERENCES TO RELATED APPLICATIONS

This application claims priority from German patent application DE 10 2016 005 699.1, filed on May 12, 2016. The entire content of this prior application is incorporated herein by reference.

BACKGROUND OF THE INVENTION

The invention relates to a measuring apparatus for measuring body parts and other workpieces, in which a sensor, which is fastened to a movable arm of an industrial robot, checks the dimensional accuracy of the workpieces. In particular, the invention relates to the replacement of a calibration body which is measured by the sensor for calibration purposes.

Measuring cells, in which the processed workpieces are checked in terms of the dimensional accuracy thereof or in terms of other manufacturing parameters, are more and more often integrated into modern assembly lines in the automotive industry and in other branches. Since the check is carried out during an ongoing manufacturing process, the workpieces in the measuring cells need to be measured not only with a high accuracy (typically of the order of 100 µm) but also very quickly. Moreover, the measuring cells must operate very reliably since failures of the measuring apparatuses may severely impair the operation of the assembly line.

In order to satisfy these demands, known measuring apparatuses of this type, as a rule, comprise an industrial robot having a movable arm. A sensor with which it is possible to measure the pose of structures of the workpieces relative to the sensor is fastened to the movable arm. By way of example, these structures may be bores, edges, folds or seams. An industrial robot is understood to mean a universally employable automatic movement unit with a plurality of axes, the movements of which are freely programmable and, optionally, sensor-guided in respect of the movement sequence, the movement paths and the movement angles. The combination of position and orientation of a body in the Cartesian space is referred to as "pose". Three Cartesian coordinates and three angle coordinates are usually used to specify the pose. As a rule, the sensors fastened to the arm of the industrial robot are optical sensors since the pose of structures of the workpieces may thus be measured quickly, contactlessly and with a high accuracy.

If the measuring device determines intolerably large deviations between the measured values and the intended values, the relevant workpiece is separated out in a subsequent step and optionally post-processed in order to be able to be used again.

As a rule, it is necessary for the workpieces to be measured in respect of an external coordinate system which is stationary in space. Since the sensor is only able to measure the pose of structures of the workpieces relative to the sensor, the position of the sensor must therefore also be exactly determinable in the external coordinate system. Therefore, the industrial robot needs to displace the sensor with a high accuracy to the desired position relative to the workpiece.

A distinction is made between the absolute accuracy and the repetition accuracy in the case of industrial robots. The absolute accuracy is understood to mean the maximum deviation between an expected intended pose and the actual pose, which emerge when approaching the intended pose from different directions. The repetition accuracy specifies how accurately a robot may be positioned in the case of multiple approaches of a pose from the same direction. For the measurement problems considered here, both the absolute accuracy and the repetition accuracy must be very high because the workpieces can only be measured precisely in the external coordinate system in this case. Restrictions in the absolute accuracy may be compensated for by a correlation with an external measurement system and the offsets resulting therefrom.

The repetition accuracy is impaired by thermal influences in particular. On account of the relatively large dimensions of industrial robots, temperature variations of a few degrees centigrade may lead to deviations of the actual pose of the TCP (tool center point; specifies the tool work point and hence the location of the sensor) from the intended pose of the order of one millimeter.

In order to improve the repetition accuracy of industrial robots, these are usually calibrated at regular time intervals, to be precise typically during the ongoing manufacturing operation. In the measuring apparatuses considered here, the calibration is carried out by virtue of the sensor carried by the industrial robot approaching a calibration body which is arranged stationary in space and measuring the pose of a calibration element fastened to the calibration body at that location. The calibration elements are often spheres since these look the same when viewed from any direction. If the pose of the calibration element is exactly known in the external coordinate system, it is possible to calibrate the measuring apparatus by comparing the pose of the calibration element as measured by the sensor to the precisely known pose thereof. Usually, the pose of not only one calibration element, but of a plurality of calibration elements is measured.

Calibration methods of this type are described in EP 1 189 732 B1 (corresponds to U.S. Pat. No. 6,615,112 B1). There, the calibration body is embodied as a calibration table, the calibration body having a plane surface on which measurement marks which, for example, may be embodied as circular thin platelets or circular openings are arranged.

Moreover, the prior art has disclosed calibration bodies having a hollow cylindrical carrier, on the circumferential side of which a plurality of spherical calibration elements are mounted. The carrier is fastened to a base plate or another carrying structure.

A problem arising in practice independently of the embodiment of the calibration body is that the calibration body may be damaged during the operation of the measuring apparatus. This is caused by often incorrectly programmed movements of the industrial robot or workpieces which have inadvertently become detached from a holder. Since even small deformations of the calibration body are immediately reflected in a reduced measurement accuracy, the calibration body must be remeasured in the external coordinate system; this requires much time outlay and interrupts the manufacturing process for a relatively long time.

Therefore, it is often more advantageous to replace the calibration body with a new calibration body, the dimensions of which were determined exactly by a preceding measurement. Then, the new calibration body is aligned on the carrying structure with the aid of an alignment element. The dimensions of the new calibration body, specifically, in particular, the pose of the calibration elements relative to the alignment element which sets the pose of the calibration body relative to the base plate or any other carrying structure, were previously stored on a data medium and supplied to an evaluation unit of the measuring apparatus.

However, such replacement of a calibration body also leads to relatively long outage of the measuring apparatus since the application of the data which specify the pose of the calibration elements relative to the alignment element requires system knowledge and may therefore only be carried out by an employee of the measuring apparatus manufacturer or appropriately educated staff.

SUMMARY OF THE INVENTION

It is an object of the invention to specify a method for calibrating a measuring apparatus and a measuring apparatus suitable for carrying out the method, in which the calibration body may be replaced more quickly.

In respect of the method, this object is achieved by a method for calibrating a measuring apparatus configured to measure body parts and other workpieces, comprising the following steps:
a) providing a measuring device comprising:
  an industrial robot having a movable arm,
  a sensor which is fastened to the movable arm and configured to measure the pose of workpieces relative to the sensor,
  a carrying structure, the pose of which relative to the industrial robot is known, and
  a calibration body comprising:
    a carrier,
    an alignment element arranged rigidly relative to the carrier, said alignment element interacting with a counter piece provided on the carrying structure,
    a calibration element rigidly fastened to the carrier,
    an encoding zone, in which data which specify the pose of the calibration element relative to the alignment element are encoded;
b) aligning the calibration body on the carrying structure with the aid of the alignment element and the counter piece;
c) approaching the encoding zone with the sensor;
d) reading the data encoded in the encoding zone with the aid of the sensor;
e) ascertaining the pose of the calibration element relative to the carrying structure using the data read in step d);
f) approaching the calibration element with the sensor;
g) calibrating the measuring apparatus by virtue of the sensor measuring the pose of the calibration element.

The invention is based on the consideration that the measuring apparatus in the form of the sensor anyway comprises a device with which data may be read. Therefore, the calibration body comprises an encoding zone, in which data which specify the pose of the calibration element relative to the alignment element are encoded. If the sensor approaches the encoding zone with the aid of the industrial robot, it is able to read the data encoded therein. Suitably programmed software in the evaluation unit links the read data with the other stored coordinate systems, as a result of which the pose of the calibration element may be determined with a high accuracy in the external coordinate system. The new calibration body may then be used immediately for normal calibration of the measuring apparatus during the ongoing measurement operation.

In this way, the measuring apparatus may be put into operation again after the replacement of the calibration body, without operators with knowledge of the system having to read data and undertake configurations. Approaching the encoding zone with the sensor in step c) is preferably triggered by an instruction issued by an operator at a controller of the industrial robot. Then, all subsequent steps may be carried out independently and under program control. In this way, the time interval between damage to the calibration body and a calibration process using a new calibration body may be carried out within a few minutes by the operator of the measuring apparatus.

Naturally, these advantages may also be used during the initial start-up of the measuring apparatus. In this case, the calibration body is not replaced but used for the first time.

The invention may be used particularly advantageously if provision is made of not only one calibration body but of a plurality of calibration bodies. This is because, in general, the frequency with which a calibration body needs to be replaced increases in this case.

It is expedient if, between steps b) and c), the calibration body is fastened to the carrying structure in a manner decoupled in terms of forces in such a way that forces acting on the calibration body are at least substantially not transferred to the carrying structure. This ensures that although forces from a robotic arm or a workpiece acting on the calibration body may optionally deform the latter or may lead to a detachment from the carrying structure, the carrying structure itself is not damaged. This is because if the carrying structure is also damaged via the calibration body, said carrying structure must likewise be replaced. This causes substantially greater outlay than the replacement of the calibration body.

In the simplest case, decoupling in terms of forces is achieved by virtue of the calibration body only lying on the carrying structure with its inherent weight. However, a disadvantage thereof is that the calibration body itself is changed in its position by very small forces and must then be realigned again. It is even less advantageous if such small changes in position remain unnoticed and then lead to measurement errors.

It is therefore preferred if elastic fastening elements are used for fastening the calibration body to the carrying structure. As a result, the calibration body may be deflected against the forces produced by the elastic fastening elements but is, at the same time, returned to its position set by the alignment element by these forces.

If the sensor is an optical sensor, the data may be optically encoded in the encoding zone. By way of example, the encoding zone may have a line pattern or point pattern which is captured by the camera of the sensor in the case of sensors which produce a light pattern on the workpiece and record, by means of a camera, an image of the workpiece with the light pattern projected thereon. In the case of tactile sensors, the data may also be encoded by a suitable surface structure, e.g. by point-like or line-shaped elevations or recesses.

The measurement data encoded in the encoding zone are preferably obtained by a measurement outside of the measuring apparatus, specifically, in particular, by a measurement at the calibration body manufacturer's premises.

The alignment element may be any structure which, in cooperation with the counter piece, facilitates mutual alignment of two bodies. In addition to studs and other projections, differently shaped recesses or edges, the effect of which is based on form fit, come into consideration. However, magnetically acting elements are also suitable. A corresponding statement naturally also applies to the counter piece, which is functionally adapted to the alignment element.

A measuring apparatus suitable for carrying out the method, for measuring body parts or other workpieces comprises:
a) an industrial robot having a movable arm,
b) a sensor which is fastened to the movable arm and configured to measure the pose of workpieces relative to the sensor,
c) a carrying structure, the pose of which relative to the industrial robot is known, and
d) a calibration body comprising:
a carrier,
an alignment element arranged rigidly relative to the carrier, said alignment element interacting with a counter piece provided on the carrying structure,
a calibration element rigidly fastened to the carrier,
an encoding zone, in which data which specify the pose of the calibration element relative to the alignment element are encoded,
e) an evaluation unit configured to ascertain the pose of the calibration element relative to the carrying structure using the data which were read with the aid of the sensor in the encoding zone.

The advantages and preferred configurations specified in respect of the method apply analogously to the measuring apparatus according to the invention.

BRIEF DESCRIPTION OF THE DRAWINGS

Exemplary embodiments of the invention are explained in more detail below with reference to the drawings. Therein.

DETAILED DESCRIPTION OF PREFERRED EMBODIMENTS

Figure 1:
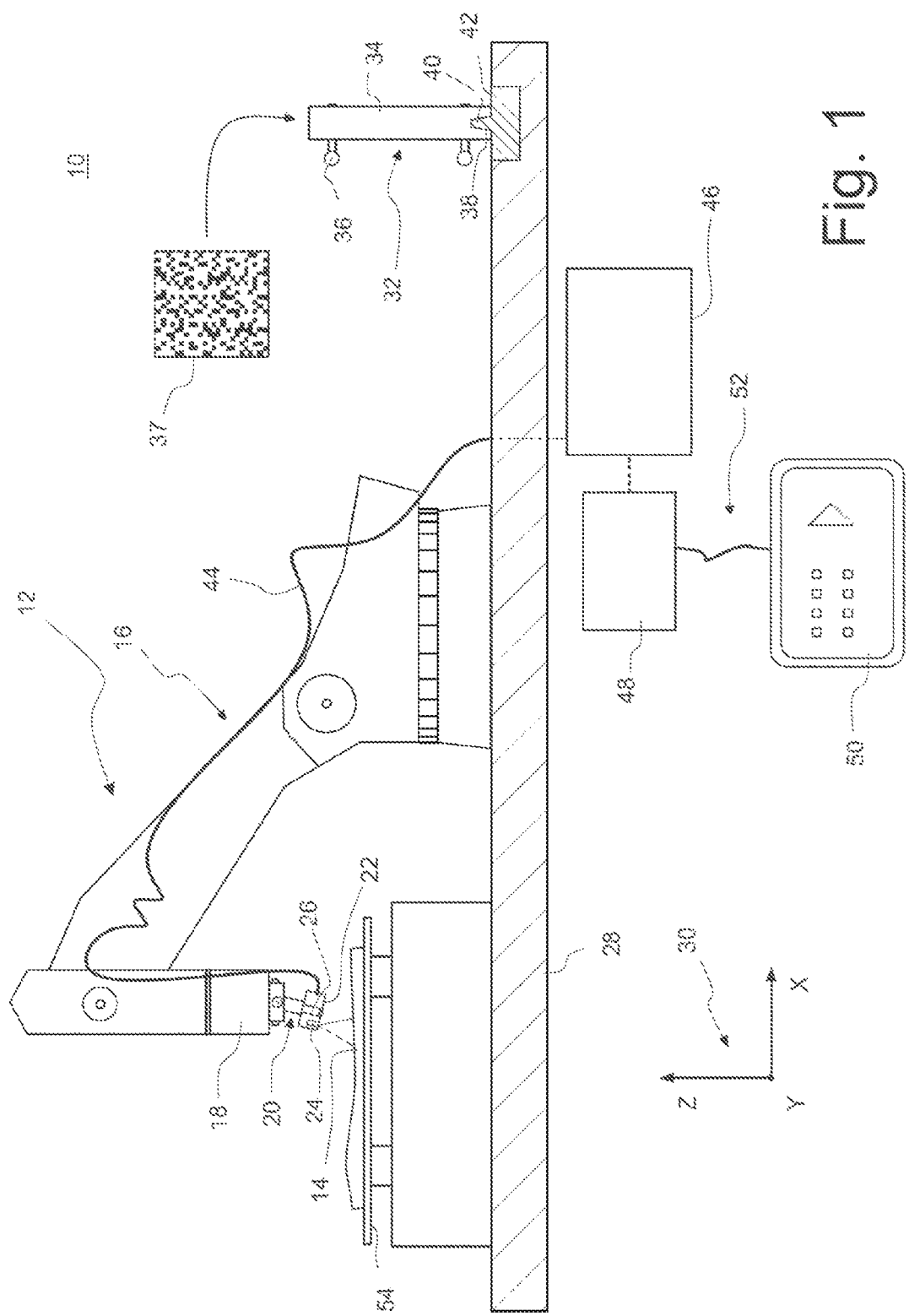
FIG. 1 shows a schematic illustration of a measuring cell with a measuring apparatus according to the invention in a side view.

In a schematic side view, FIG. 1 shows a measuring cell 10, in which a measuring apparatus 12 according to the invention is arranged. The measuring cell 10 is part of an assembly line and surrounded by walls, which are in part provided with doors and not depicted in FIG. 1 for reasons of clarity. Workpieces 14 may be introduced into, and removed from, the measuring cell 10 through the doors. Industrial robots, conveying devices or specific handling machines, which are likewise not shown in FIG. 1, serve to this end.

The measuring apparatus 12 comprises an industrial robot 16, which is a 6-axis robot in the depicted exemplary embodiment. For larger workpieces 14, 7-axis robots are often more expedient; in these, the design shown in FIG. 1 is additionally displaceable in one direction along a rail fastened to the floor.

The industrial robot 16 comprises a movable arm 18, which carries a likewise movable gripper 20, which sets the TCP and has an optical sensor 22 attached thereto. In the depicted exemplary embodiment, the optical sensor 22 comprises a line producing device 24 and a camera 26. Using the sensor 22, it is possible to measure the pose of structures of the workpiece 14, to be precise with a measurement accuracy of the order of 100 µm, by way of multi-line triangulation. For even more versatile applications, the images produced by the camera 26 may be subjected to grayscale value image processing and a shadow evaluation in order, for example, to be able to capture bolts more quickly and more reliably.

Moreover, a base plate 28, to which the industrial robot 16 is fastened in a rigid manner (or in a movable manner in the case of a 7-axis robot) is part of the measuring apparatus 12. In the depicted exemplary embodiment, the base plate 28 forms the reference for an external coordinate system 30.

The measuring apparatus 12 moreover includes a calibration body 32, which comprises a carrier 34 and a plurality of spherical calibration elements 36 fastened thereto. An alignment element which is arranged rigidly relative to the carrier 34 is mounted on the lower end of the carrier 34. For reasons of simplicity, the alignment element is embodied as a central conical recess 38 in FIG. 1 and said alignment element interacts with a conical projection 40 on the base plate 28. In actual fact, the calibration body 32 comprises three alignment elements in order also to fix the orientation thereof about its longitudinal axis. A more detailed explanation in this respect is provided below with reference to FIG. 3.

Figure 3:
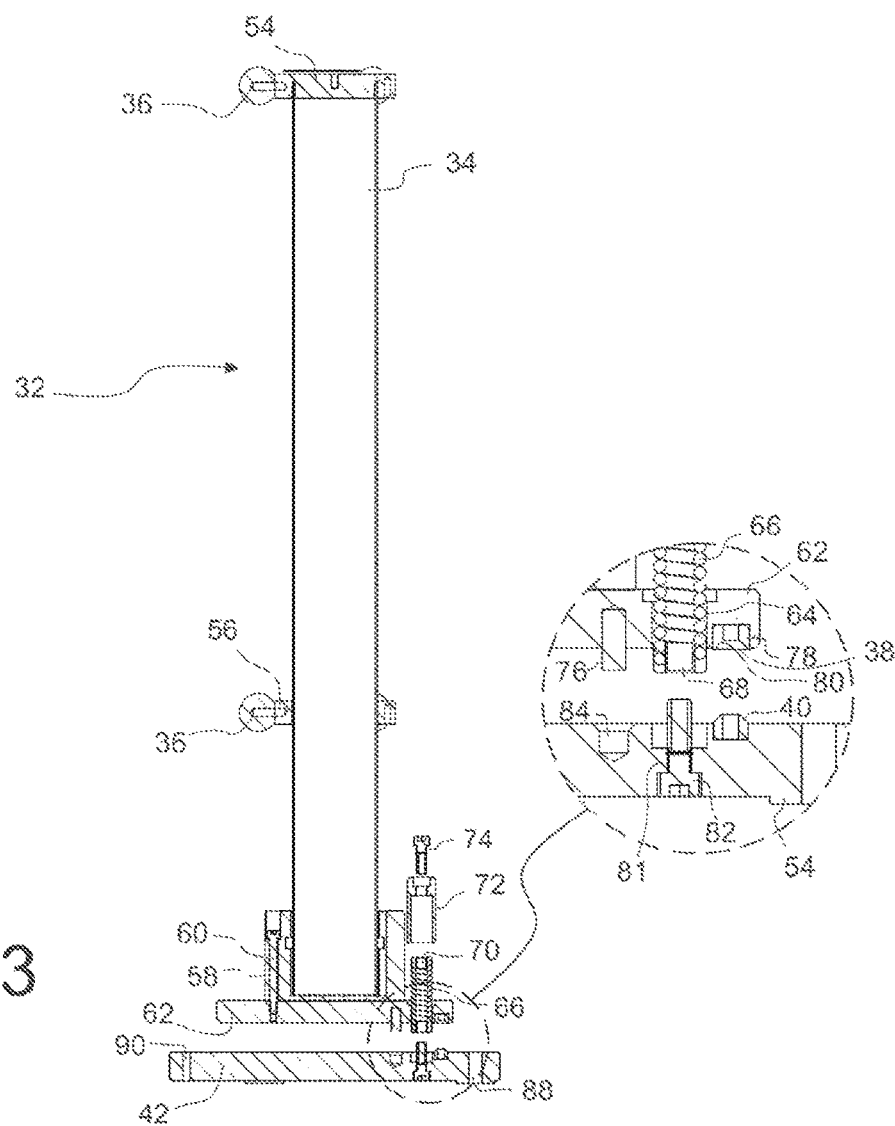
FIG. 3 shows a longitudinal section through the calibration body shown in FIG. 2 along the line III-III in a partly assembled state.

On the upper side thereof, the carrier 34 is provided with a sticker 35 which may be identified in FIG. 3 and on which a data matrix code 37 is printed.

The conical projection 40 is not mounted immediately on the base plate 28, but on an insert 42 which is held in replaceable manner in a recess in the base plate 28. The plate-shaped and very precisely processed insert 42 is provided with markings in order to be able to calibrate it prior to starting up the measuring apparatus 12. The base plate 28 and the insert 42 form a common carrying structure for the calibration body 32 and the industrial robot 16.

The sensor 22 is connected to an evaluation unit 46 by way of a data cable 44, which may be enveloped by movable protective tubing (not depicted here). However, a wireless communication link to the sensor 22 may also be considered. From the data produced by the sensor 22, the evaluation unit 46 supplies the desired specifications in respect of the pose of the structures captured on the workpiece 14. Here, the evaluation unit 46 communicates with a robot controller 48, which in turn may be actuated by an operating unit 50 by way of a data cable 52.

In the depicted exemplary embodiment, the workpiece 14 is mounted on a workpiece carrier 54, which is rigidly connected to the base plate 28. However, the workpiece 14 may also be measured with the aid of the measuring apparatus 12 while it is held by a further industrial robot which delivers the workpiece 14 to the industrial robot 16 in a suitable manner. After the measurement, the further industrial robot may then transfer the workpiece 14 to a subsequent processing cell in the assembly line.

Figure 2:
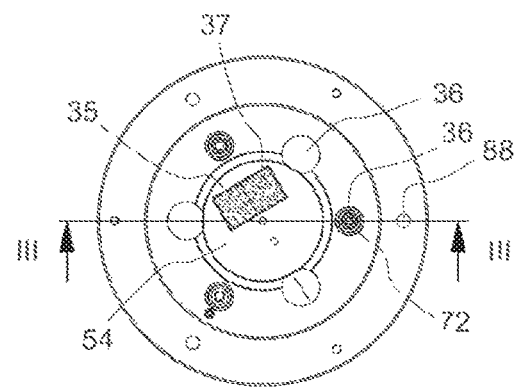
FIG. 2 shows a plan view of the calibration body shown in FIG. 1.

FIGS. 2 and 3 show the calibration body 32 in a plan view and in a longitudinal section along the line III-III, respectively.

The carrier 34 consists of a pipe which is manufactured from carbon fiber reinforced plastic and terminated at the upper end thereof by a circular cover plate 54. At the circumferential side thereof, three spherical calibration elements 36 are fastened thereon with an angular spacing of 120°. Three further calibration elements are affixed to a ring 56 which surrounds the carrier 34. The plane top side of the cover plate 54 carries the sticker 35 with the data matrix code 37.

The lower end of the carrier 34 is adhesively bonded into a sleeve 58 which is rigidly fastened to a foot 62 of the calibration body 32 with the aid of three screws 60. As may be identified best in the magnified detail of FIG. 3, the foot 62 comprises three bores 64, which are arranged with an angular spacing of 120° from one another and in each of which a tension spring 66 is received in an axially movable manner. A threaded insert 68 is inserted into the lower end of the tension springs 66 in each case. Equivalent threaded inserts 70 are mounted on the opposite upper end of the respective tension spring 66.

From FIG. 3, which shows the calibration body 32 in a partly assembled state, it is possible to identify that a hollow cylindrical cap 72 has been placed onto each of the tension springs 66. By means of a screw 74, which passes through a bore in the base part of the cap 72, this cap 72 is screwed to the upper threaded insert 70 and hence to the respective tension spring 66.

Three support studs 76, on which the foot 62 rests if it is intended to be put down outside of the measuring cell prior to the assembly, are inserted into the foot 62 immediately next to the bores 64 for the tension springs 66. Further, foot 62 is provided with three recesses 38, which are defined by inserts 78 and of which the recess identifiable in FIG. 3 has a partly conical inner surface 80.

FIG. 3 likewise shows the replaceable insert 42 which, together with the base plate 28, defines a carrying structure for the calibration body 32 and the industrial robot 16. In the magnified detail of FIG. 3, it is possible to identify that a screw 82 in each case reaches through one of three stepped bores 81, said screw being screwed into the lower threaded insert 68 and thus connecting the respective tension spring 66 to the insert 42. Therefore, the tension springs 66 produce a force in the assembled state, said force pressing the cap 72 against the foot 62 and hence pressing the foot 62 against the insert 42. If a torque is exerted onto the inherently rigid calibration body 32 by way of an external influence, for example a movable robotic arm, the foot 62 may lift off from the insert 42 against the force of the tension springs 66 and thus be tilted. At the same time, the tension springs 66 produce a restoration force which causes the calibration body 32 to return into its initial position on its own after the externally acting torque abates, until the foot 62 is pressed against the insert 42 again.

In addition to the stepped bores 81 for the screws 82, blind bores 84, into which the support studs 76 of the calibration body 32 engage in the assembled state, are situated in the insert 42.

The conical projections 40, which are likewise embodied as inserts and which engage in the opposing recesses 38 in such a way that the calibration body 32 is aligned in all three spatial directions by a form fit, are likewise situated adjacent to the stepped bores 81.

A further bore 88 in the insert 42 serves to fasten the insert 42 in the recess of the base plate 28. A bore 90 with a smaller diameter serves as a marker, with the aid of which the insert 42 may be calibrated after being fastened in the base plate 28. If the location of the marker 90 is precisely known, the position of the centering recess 78, and hence the position of the calibration body 32, is also known relative to the external coordinate system 30.

As already mentioned above, a movable part of the industrial robot 16 or the workpiece 14 may inadvertently touch the calibration body 32 during the operation of the measuring cell 10. As a rule, such a contact leads to a torque acting on the calibration body 32 and the latter being tilted relative to the insert 42. As a consequence of the elastic connection with the aid of the tension springs 66, the forces acting on the calibration body 32 from externally are not transferred onto the insert 42. As a rule, the latter remains undamaged on account of this and need not be replaced. Should the insert 42 nevertheless be damaged at some point, the insert 42 may be replaced by a new insert comparatively easily. However, the new insert must then be recalibrated in relation to the external coordinate system 30 with the aid of the markers 90, which requires much time.

However, if the external forces act on the calibration body 32, it is not possible to preclude that the latter deforms (if only to a small extent). Then, the calibration elements 36 are no longer situated at the previously determined locations. Such a fault has an immediate impact on the accuracy with which the pose of structures of the workpiece 14 is measured relative to the external coordinate system 30.

Since it is not possible to know whether or not a deformation has taken place, the calibration body 32 is replaced, as a matter of principle and immediately, with a new calibration body 32 in the case of a collision with another relatively large object, said new calibration body being stored with the operator of the measuring cell 10. Replacement is easy since the calibration body 32 is merely inserted into the insert 42 and screwed in with the aid of the screws 74. If need be, a loss-prevention device (e.g. a short piece of rope not depicted in the figures) should also be released such that the deformed calibration body may be removed from the measuring cell 10.

The operating unit 50 is now used to issue the instruction to the robot controller 48 that the sensor 22 should be transferred into a read position in respect to the data matrix code 37. The corresponding target position is stored in the robot controller 48. The movable arm 18 and the gripper 20 now position the sensor 22 over the calibration body 32 in such a way that the camera 26 of the sensor 22 is able to completely capture the data matrix code 37. Data which specify the pose of the calibration element 36 relative to the recess 38 are encoded in the data matrix code 37.

The evaluation unit 46 identifies the data matrix code 37 and reads the data encoded therein. Now, the evaluation unit 46 knows as an actual value precisely where the calibration elements 36 are situated relative to the recess 38 and hence relative to the base plate 28 and the external coordinate system 30.

In a next step, the robot controller 48 is prompted to actuate the industrial robot 60 in such a way that the sensor 22 approaches one or more of the calibration elements 36 in order to measure the pose thereof. The industrial robot 16 is calibrated by the comparison of the pose measured thus with the previously determined actual value of the pose relative to the external coordinate system 30.

If the sensor 22 now captures a bore, an edge or another structure of the workpiece 14 during the measurement operation, it is possible to exactly determine the pose thereof in the external coordinate system 30 since the pose of the TCP, and hence of the sensor 22, is precisely known after the calibration. As a rule, the measurement values captured by the sensor 22 are corrected by correction values which were obtained by the calibration. As an alternative thereto, it is possible to actuate the industrial robot 16 on the basis of the same correction values in such a way that it approaches the desired intended poses of the TCP, and hence of the sensor 22, more accurately. However, this requires an intervention in the robot controller 48.

Typically, the calibration is carried out again at regular time intervals or in the case of changes in the ambient conditions (in particular in the temperature), as is known per se from the prior art.

The invention claimed is:

1. Method for calibrating a measuring apparatus configured to measure body parts and other workpieces, comprising the following steps:
   a) providing a measuring device comprising:
      an industrial robot having a movable arm,
      a sensor which is fastened to the movable arm and configured to measure the pose of workpieces relative to the sensor,
      a carrying structure, the pose of which relative to the industrial robot is known, and
      a calibration body comprising:
         a carrier,
         an alignment element arranged rigidly relative to the carrier, said alignment element interacting with a counter piece provided on the carrying structure,
         a calibration element rigidly fastened to the carrier,
         an encoding zone, in which data which specify the pose of the calibration element relative to the alignment element are encoded;
   b) aligning the calibration body on the carrying structure with the aid of the alignment element and the counter piece;
   c) approaching the encoding zone with the sensor;
   d) reading the data encoded in the encoding zone with the aid of the sensor;
   e) ascertaining the pose of the calibration element relative to the carrying structure using the data read in step d);
   f) approaching the calibration element with the sensor; and
   g) calibrating the measuring apparatus by virtue of the sensor measuring the pose of the calibration element.

2. Method according to claim 1, wherein, between steps b) and c), the calibration body is fastened to the carrying structure in a manner decoupled in terms of forces in such a way that forces acting on the calibration body are at least substantially not transferred to the carrying structure.

3. Method according to claim 2, wherein elastic fastening elements are used for fastening the calibration body to the carrying structure.

4. Method according to claim 1, wherein the sensor is an optical sensor.

5. Method according to claim 4, wherein the data are optically encoded in the encoding zone.

6. Method according to claim 5, wherein the encoding zone comprises a line pattern or point pattern.

7. Method according to claim 1, wherein step c) is triggered by an instruction, issued by an operator, to a controller of the industrial robot and wherein the subsequent steps are carried out under program control.

8. Method according to claim 1, wherein the measurement data encoded in the encoding zone are obtained by a measurement outside of the measuring apparatus.

9. Measuring apparatus for measuring body parts and other workpieces, comprising:
   a) an industrial robot having a movable arm,
   b) a sensor which is fastened to the movable arm and configured to measure the pose of workpieces relative to the sensor,
   c) a carrying structure, the pose of which relative to the industrial robot is known, and
   d) a calibration body comprising:
      a carrier,
      an alignment element arranged rigidly relative to the carrier, said alignment element interacting with a counter piece provided on the carrying structure,
      a calibration element rigidly fastened to the carrier,
      an encoding zone, in which data which specify the pose of the calibration element relative to the alignment element are encoded, and
   e) an evaluation unit configured to ascertain the pose of the calibration element relative to the carrying structure using the data which were read with the aid of the sensor in the encoding zone.

10. Measuring apparatus according to claim 9, wherein the calibration body is fastened to the carrying structure in a manner decoupled in terms of forces in such a way that forces acting on the calibration body are at least substantially not transferred to the carrying structure.

11. Measuring apparatus according to claim 10, wherein the calibration body is fastened to the carrying structure with the aid of elastic fastening elements.

* * * * *

UNITED STATES PATENT AND TRADEMARK OFFICE
CERTIFICATE OF CORRECTION

PATENT NO. : 10,232,511 B2
APPLICATION NO. : 15/590634
DATED : March 19, 2019
INVENTOR(S) : Peter Hofmann et al.

Page 1 of 1

It is certified that error appears in the above-identified patent and that said Letters Patent is hereby corrected as shown below:

On the Title Page

Applicant (71), Column 1, Line 1-2:
Delete "CARL ZEISS AUTOMATED INSPECTION GMBH & CO. KG" and insert --CARL ZEISS AUTOMATED INSPECTION GMBH--

Signed and Sealed this
Second Day of July, 2019

Andrei Iancu
*Director of the United States Patent and Trademark Office*